(12) United States Patent
Crews (10) Patent No.: US 7,052,901 B2
(45) Date of Patent: May 30, 2006

(54) BACTERIA-BASED AND ENZYME-BASED MECHANISMS AND PRODUCTS FOR VISCOSITY REDUCTION BREAKING OF VISCOELASTIC FLUIDS

(75) Inventor: James B. Crews, Willis, TX (US)

(73) Assignee: Baker Hughes Incorporated, Houston, TX (US)

( * ) Notice: Subject to any disclaimer, the term of this patent is extended or adjusted under 35 U.S.C. 154(b) by 806 days.

(21) Appl. No.: 10/041,528

(22) Filed: Oct. 24, 2001

(65) Prior Publication Data

US 2002/0076803 A1    Jun. 20, 2002

Related U.S. Application Data

(60) Provisional application No. 60/244,804, filed on Oct. 31, 2000.

(51) Int. Cl.
   *C12S 1/00*  (2006.01)
   *C22S 13/00* (2006.01)

(52) U.S. Cl. .................. 435/281; 435/262; 507/101; 507/201; 507/129; 507/132; 507/240; 507/245

(58) Field of Classification Search ........... 435/262, 435/281; 507/101, 132, 129, 201, 240, 245
   See application file for complete search history.

(56) References Cited

U.S. PATENT DOCUMENTS

| | | | |
|---|---|---|---|
| 3,332,487 A * | 7/1967 | Jones ................... | 166/11 |
| 3,612,178 A | 10/1971 | Germer et al. | |
| 3,800,872 A | 4/1974 | Friedman | |
| 4,035,289 A | 7/1977 | Guillerme et al. | |
| 4,292,406 A | 9/1981 | Ljungdahl et al. | |
| 4,410,625 A | 10/1983 | Cadmus | |
| 4,522,261 A | 6/1985 | McInerney et al. | |
| 4,886,746 A | 12/1989 | Cadmus et al. | |
| 4,905,761 A | 3/1990 | Bryant | |
| 4,996,153 A | 2/1991 | Cadmus et al. | |
| 5,265,674 A | 11/1993 | Fredrickson et al. | |
| 5,297,625 A | 3/1994 | Premuzic et al. | |
| 5,369,031 A | 11/1994 | Middleditch et al. | |
| 5,551,516 A | 9/1996 | Norman et al. | |
| 5,869,325 A | 2/1999 | Crabtree et al. | |
| 5,964,295 A | 10/1999 | Brown et al. | |
| 5,979,555 A | 11/1999 | Gadberry et al. | |
| 6,035,936 A | 3/2000 | Whalen | |
| 6,110,875 A | 8/2000 | Tjon-Joe-Pin et al. | |
| 6,140,277 A | 10/2000 | Tibbles et al. | |
| 6,232,274 B1 | 5/2001 | Hughes et al. | |
| 6,239,183 B1 | 5/2001 | Farmer et al. | |
| 6,613,720 B1 | 9/2003 | Feraud et al. | |

* cited by examiner

*Primary Examiner*—Francisco Prats
(74) *Attorney, Agent, or Firm*—Madan, Mossman & Sriram P.C.

(57) ABSTRACT

It has been discovered that fluids viscosified with viscoelastic surfactants (VESs) may have their viscosities reduced (gels broken) by the direct or indirect action of a biochemical agent, such as bacteria, fungi, and/or enzymes. The biochemical agent may directly attack the VES itself, or some other component in the fluid that produces a by-product that then causes viscosity reduction. The biochemical agent may disaggregate or otherwise attack the micellar structure of the VES-gelled fluid. The biochemical agent may produce an enzyme that reduces viscosity by one of these mechanisms. A single biochemical agent may operate simultaneously by two different mechanisms, such as by degrading the VES directly, as well as another component, such as a glycol, the latter mechanism in turn producing a by-product (e.g. an alcohol) that causes viscosity reduction. Alternatively, two or more different biochemical agents may be used simultaneously. In a specific, non-limiting instance, a brine fluid gelled with an amine oxide surfactant can have its viscosity broken with bacteria such as *Enterobacter cloacae, Pseudomonas fluorescens, Pseudomonas aeruginosa*, and the like.

26 Claims, 7 Drawing Sheets

BACTERIA-BASED AND ENZYME-BASED MECHANISMS AND PRODUCTS FOR VISCOSITY REDUCTION BREAKING OF VISCOELASTIC FLUIDS

CROSS-REFERENCE TO RELATED APPLICATION

This application claims the benefit of U.S. provisional application 60/244,804 filed Oct. 31, 2000.

FIELD OF THE INVENTION

The present invention relates to gelled treatment fluids used during hydrocarbon recovery operations, and more particularly relates, in one embodiment, to methods of "breaking" or reducing the viscosity of aqueous treatment fluids containing viscoelastic surfactant gelling agents used during hydrocarbon recovery operations.

BACKGROUND OF THE INVENTION

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates that can cause the fluids to degrade and prematurely settle out the proppant before the fracturing operation is complete. Various fluids have been developed, but most commercially used fracturing fluids are aqueous based liquids that have either been gelled or foamed. When the fluids are gelled, typically a polymeric gelling agent, such as a solvatable polysaccharide, is used. The thickened or gelled fluid helps keep the proppants within the fluid. Gelling can be accomplished or improved by the use of crosslinking agents or crosslinkers that promote crosslinking of the polymers together, thereby increasing the viscosity of the fluid.

The recovery of fracturing fluids may be accomplished by reducing the viscosity of the fluid to a low value so that it may flow naturally from the formation under the influence of formation fluids. Crosslinked gels generally require viscosity breakers to be injected to reduce the viscosity or "break" the gel. Enzymes, oxidizers, and acids are known polymer viscosity breakers. Enzymes are effective within a pH range, typically a 2.0 to 10.0 range, with increasing activity as the pH is lowered towards neutral from a pH of 10.0. Most conventional borate crosslinked fracturing fluids and breakers are designed from a fixed high crosslinked fluid pH value at ambient temperature and/or reservoir temperature. Optimizing the pH for a borate crosslinked gel is important to achieve proper crosslink stability and controlled enzyme breaker activity.

While polymers have been used in the past as gelling agents in fracturing fluids to carry or suspend solid particles as noted, such polymers require separate breaker compositions to be injected to reduce the viscosity. Further, such polymers tend to leave a coating on the proppant and a filter cake of dehydrated polymer on the fracture face even after the gelled fluid is broken. The coating and/or the filter cake may interfere with the functioning of the proppant. Studies have also shown that "fish-eyes" and/or "microgels" present in some polymer gelled carrier fluids will plug pore throats, leading to impaired leakoff and causing formation damage.

Recently it has been discovered that aqueous drilling and treating fluids may be gelled or have their viscosity increased by the use of non-polymeric viscoelastic surfactants (VES). These VES materials are advantageous over the use of polymer gelling agents in that they do not damage the formation, leave a filter cake on the formation face, coat the proppant or create microgels or "fish-eyes". It is still necessary, however, to provide some mechanism that will break the viscosity of VES-gelled fluids.

It is known to use bacteria in biodegradation, bioremediation, or microbe enhanced oil recovery (MEOR) techniques. Bacteria are primarily known to decompose reservoir hydrocarbons to produce more easily producible fluids, or to decompose hydrocarbon-based pollutants to environmentally acceptable states.

It is also known that bacteria will degrade drilling fluids. U.S. Pat. No. 3,612,178 discloses a flow-stimulating liquid solution and methods of used based primarily on the combination of a linear alkyl sulfonate as a detergent and penetrant, serving as a special carrier for a lauric amide emulsifier to draw oil into an emulsion and for a phosphate, as sodium phosphate, to draw water into the emulsion. A preservative is added to inhibit deterioration due to bacteria. Similarly, U.S. Pat. No. 3,800,872 relates to methods for recovery of petroleum from a subterranean formation which include injecting into the formation an aqueous flooding medium which assumes a viscosity in oil-rich portions of the formation that is significantly less than the viscosity assumed in the portions low in oil content, the flooding medium thereby preferentially driving the oil, as opposed to water, from the formation. The flooding medium may include a material such as guar that imparts a high viscosity but is subject to rapid degradation by the bacteria in the formation, and a poisoning agent for the bacteria, such as ortho-cresol, which is preferentially soluble in oil. The use of bacteria to directly digest or degrade polymeric gels used in fracturing is also known. However, it is presently unknown to use bacteria and/or enzymes to break viscosities of fluids gelled using viscoelastic surfactants.

General background information concerning biodegrading surfactants may be found in D. R. Karsa, et al., ed., *Biodegradability of Surfactants*, Blackie Academic & Professional, 1995.

It would be desirable if a viscosity breaking system could be devised to break the viscosity of fracturing fluids gelled with viscoelastic surfactants.

SUMMARY OF THE INVENTION

Accordingly, it is an object of the present invention to provide a method for breaking the viscosity of aqueous treatment fluids gelled with viscoelastic surfactants (VESs).

It is another object of the present invention to provide compositions and methods for breaking VES-surfactant substrates fluids using bacteria.

Still another object of the invention is to provide additional methods and VES fluid compositions for breaking the viscosity of aqueous fluids gelled with viscoelastic surfactants.

Yet another object of the invention is to provide methods and compositions for breaking the viscosity of aqueous fluids gelled with viscoelastic surfactants using bio-produced compounds such as lipase enzymes.

Still another object of the invention is to provide methods and compositions for breaking the viscosity of aqueous fluids gelled with viscoelastic surfactants using bio-produced compounds such as surfactants, solvents, or acid.

In carrying out these and other objects of the invention, there is provided, in one form, a method for breaking viscosity of aqueous fluids gelled with a viscoelastic surfactant (VES) that involves adding to an aqueous fluid gelled with at least one viscoelastic surfactant, a viscosity-breaking biochemical agent in an amount effective to reduce the viscosity of the gelled aqueous fluid. Suitable biochemical agents include bacteria, fungi, enzymes, and combinations thereof.

In another embodiment, the invention involves a method for breaking viscosity of aqueous fluids gelled with viscoelastic surfactants by adding to an aqueous fluid gelled with at least one viscoelastic surfactant, at least one bacteria type in an amount effective to reduce the viscosity of the VES-gelled aqueous fluid.

DETAILED DESCRIPTION OF THE INVENTION

It has been discovered that various biochemical agents, such as bacteria and enzymes, will directly degrade or digest the gel created by various viscoelastic surfactants (VESs) in an aqueous fluid, or the biochemical agents will degrade or digest other materials in the viscosified fluid such as alcohols, glycols, starches, potassium or other formate, and the like to produce by-products that will reduce the viscosity of the gelled aqueous fluid either directly, or by disaggregation or rearrangement of the VES micellar structure.

That is, in various non-limiting embodiments of the invention:
1. the biochemical agent (bacteria, fungus, and/or enzyme) will attack and break down the surfactant itself, using the surfactant molecule as its carbon source;
2. the biochemical agent (bacteria, fungus, and/or enzyme) will attack and break down another component in the VES-gelled aqueous fluid, whether already present or intentionally added as a carbon source for the biochemical agent, including, but not limited to, alcohols, monoalcohol polymers, alcohol fatty acids, alkyl fatty acids, glycols, starches, potassium or other formate, polysaccharides, sugars, sugar chelants, sugar alcohols, aliphatic alcohols, reservoir crude oils, proteins, VES stabilizers, amino acids, acetates, phosphonates, phospholipids, lactates, isocyanates, esters, turpenes, butyrates, propionates, salicylates, hexaonates, nitrilotriacetic acid, ethylenediaminetetraacetic acid, amino chelant compounds (e.g. hydroxyethyliminodiacetic acid), polyaspartates, pyrrolidone compounds, and mixtures thereof;
3. the biochemical agent (bacteria, fungus, and/or enzyme) will reduce the viscosity of the VES-gelled fluid by disrupting the VES micellar structure by disaggregating the VES micelles (causing them not to be aggregated together) or rearranging the VES micellar structure (from rod- or worm-shape to spherical);
4. the biochemical agent may be a bacteria and/or fungus which in turn secrets an enzyme that reduces the viscosity of the VES-gelled aqueous fluid by:
   a. directly attacking and digesting or otherwise breaking down the viscoelastic surfactant itself or catalyzing a reaction to do so;
   b. attacking and digesting or otherwise breaking down a component of the fluid other than the viscoelastic surfactant that in turn produces a by-product that reduces the viscosity of the VES-gelled aqueous fluid or catalyzing a reaction to do so; and
   c. disaggregating the VES micelles or rearranging the VES micellar structure, or producing a by-product that does so, through catalysis or other mechanism.

The use of enzymes could be very complex. For instance, the enzyme could remove a part of the surfactant molecule, such as the "head" and/or "tail" portions to alter its structure. Or the enzyme could "add" another material or functionality, such as ammonium or phosphate, to the "head" group that would alter its surfactant properties and disrupt the micellar structure.

It will be also appreciated that the biochemical agent, such as bacteria or fungus, may be biotechnically engineered to serve the functions described. There are several biotechnologies that can be employed. Growth challenge, selective gene expression, radiated for selective gene expression, and gene splicing (genetically modified organisms) are just a few non-limiting examples of applicable biotechnical techniques to refine the practice of this art.

In particular, various combinations of these approaches may be used to be sure that the viscosity of the fluid is completely reduced through a variety of mechanisms. Indeed, a particular blend of biochemical agents may be custom designed for a particular VES fluid system.

It is expected that the biochemical agent can be used to reduce the viscosity of a VES-gelled aqueous fluid regardless of how the VES is ultimately utilized. For instance, the biochemical agent viscosity breaking mechanism could be used in all VES applications including, but not limited to, VES-gelled friction reducers, VES viscosifiers for loss circulation pills, fracturing fluids, gravel pack fluids, viscosifiers used as diverters in acidizing, VES viscosifiers used to clean up drilling mud filter cake, remedial clean-up of fluids after a VES treatment (post-VES treatment), and the like. One key feature to the use of bacteria as a VES degradation mechanism is that many bacteria have their own mobility, as contrasted with other VES clean-up fluids that must be transported by another means to the gel. That is, many bacteria have enhanced mobility due to the flagella propulsion characteristic that will permit them to move and contact needed VES placement sites. This is an advantage over mere chemical diffusion movement mechanisms that solvents or other agents might have.

A value of the invention is that a fracturing or other fluid can be designed to have enhanced breaking characteristics. Importantly, better clean-up of the VES fluid from the fracture and wellbore can be achieved thereby. Better clean-up of the VES directly influences the success of the fracture treatment, which is an enhancement of the well's hydrocarbon productivity.

In order to practice the method of the invention, an aqueous fracturing fluid, as a non-limiting example, is first prepared by blending a VES into an aqueous fluid. The aqueous fluid could be, for example, water, brine, aqueous-based foams or water-alcohol mixtures. Any suitable mixing apparatus may be used for this procedure. In the case of batch mixing, the VES and the aqueous fluid are blended for a period of time sufficient to form a gelled or viscosified solution. The VES that is useful in the present invention can be any of the VES systems that are familiar to those in the well service industry, and may include, but are not limited to, amines, amine salts, quaternary ammonium salts, amidoamine oxides, amine oxides, mixtures thereof and the like. Suitable amines, amine salts, quaternary ammonium salts, amidoamine oxides, and other surfactants are described in U.S. Pat. Nos. 5,964,295; 5,979,555; and 6,239,183, incorporated herein by reference. Materials sold under U.S. Pat. No. 5,964,295 include ClearFRAC™ which may also comprise greater than 10% of a glycol. One preferred VES is an amine oxide. A particularly preferred amine oxide is tallow amido propylamine oxide (TAPAO), sold by Baker Oil Tools as SurFRAQ™ VES. SurFRAQ is a VES liquid product that is 50% TAPAO and 50% propylene glycol. These viscoelastic surfactants are capable of gelling aqueous solutions to form a gelled base fluid.

The amount of VES included in the fracturing fluid depends on two factors. One involves generating enough viscosity to control the rate of fluid leak off into the pores of the fracture, and the second involves creating a viscosity high enough to keep the proppant particles suspended therein during the fluid injecting step, in the non-limiting case of a fracturing fluid. Thus, depending on the application, the VES is added to the aqueous fluid in concentrations ranging from about 0.5 to 12.0% by volume of the total aqueous fluid (5 to 120 gallons per thousand gallons (gptg)). The most preferred range for the present invention is about 1.0 to about 6.0% by volume VES product.

Propping agents are typically added to the base fluid after the addition of the VES. Propping agents include, but are not limited to, for instance, quartz sand grains, glass and ceramic beads, bauxite grains, walnut shell fragments, aluminum pellets, nylon pellets, and the like. The propping agents are normally used in concentrations between about 1 to 14 pounds per gallon (120–1700 kg/m$^3$) of fracturing fluid composition, but higher or lower concentrations can be used as the fracture design required. The base fluid can also contain other conventional additives common to the well service industry such as water wetting surfactants, non-emulsifiers and the like. As noted, in this invention, the base fluid can also contain other non-conventional additives which can contribute to the bacteria-breaking action of the VES fluid, and which are added for that purpose.

In one non-limiting embodiment of the invention, suitable bacteria for use in the invention that directly digest viscoelastic surfactants include, but are not necessarily limited to, those in the classes Enterobacter, Enterococcus, Pseudomonas, Bacillus, Leptospirillum, Clostridium, Arthrobacter, Rhodobacter, Rhodococcus, Micrococcus, Serratia, Thermoanaerobacter, Thiobacillus, Pyrococcus, Lactobacillus, Achromobacter, Propionibacterium, Thermomicrobium, Nitrobacter, Nitromsomonas, Sulfolobus, Methanobacterium, Methenococcus, Bacteroides, Fusobacterium, Syntrophus, Acetogenium, Actinomyces, Acetobacter, Citrobacter, Alteromonas, Acinetobacter, Flavobacterium, Corynebacterium, and the like and mixtures thereof.

In one non-limiting embodiment of the invention, suitable bacteria for use in the embodiment of the invention that directly digest viscoelastic surfactants include, but are not necessarily limited to, Arthrobacter globiformis, Enterobacter cloacae, Lactobacillus sporogenes, Lactobacillus bulgaricus, Lactobacillus acidophillius, Pseudomonas fluorescens, Pseudomonas aeruginosa, Actinomyces israeli, Pseudomonas putida, Nitrobacter vulgaris, Arthrobactor M1538, Bacillus megaterium, Thiobacillus novellus, Bacillus subtilis, Bacillus licheniformis, Clostridium pasteurianum, Corynebacterium glucuronolyticum, Enterococcus faecalis, Pyrococcus abyssi, Rhodococcus ST-5, Rhodococcus 33, Rhodococcus H13-A, Thermoanaerobacter ethanolicus, Thermoanaerobacter mathranii, Nitrosomonas europaea, Propionibacterium propionicus, Rhodobacter sphaeroides, Clostridium thermocellum, Clostridium ATCC #53797, Clostridium ATCC #53793, Corynebacterium, hydrocarbolastus Acetomicrobium flavidum, Acetobacter pasteurianus, Serratia marcescens, Acetobacte aceti, Achromobacter xylosoxidans and mixtures thereof.

In another non-limiting embodiment where glycol is present or added to the VES-gelled fluid, suitable glycol-splitting bacteria may include, but are not necessarily limited to, Pseudomones fluorescens, Pseudomones stutzeri, Pseudomonas aeruginosa Pseudomonas putida, Acinetobacter anitratus, Bacillus subtilis, Bacillus licheniformis, Clostridium pasteurianum, Rhodacoccus ST-5, and mixtures thereof.

In another non-limiting embodiment of the invention, fluid temperature, pressure, and pH can aid microbe metabolic activity. Increase in temperature up to as much as 250° F. (121° C.) and fluid pH between about 4.0 and about 9.0 enhances microbe metabolic activity. Increase in fluid pressure up to as much as 22,000 psi (152 kPa) can also enhance microbe metabolic activity.

In another non-limited embodiment inorganic and organic nutrients are added to aid microbe metabolic activity. Inorganic nutrients may include, but are not necessarily limited to, nitrites, nitrates, sulfites, sulfates, chlorides, phosphates, and mixtures thereof. Organic nutrients may include, but are not necessarily limited to, urea, amino acids, proteins, lipids, tryptic soy broth (TSB), agar, glucose, sugars, polysaccharides, turpenes, phosphonates, glycols, and mixtures thereof.

In the embodiments where enzymes, such as lipases, are produced by bacteria and other microorganisms, the by-products, also termed bio-products, can be selectively extracted or pulled out of the microorganism solution, as is common with enzyme products. These bio-products can then be pumped or otherwise directed into the VES surfactant to reduce its viscosity. The producing biochemical agent, such as bacteria or fungus would not itself be delivered to the VES-gelled fluid.

Besides lipase, other suitable enzymes include, but are not necessarily limited to oxidase, hydrolase, transferase, and mixtures thereof.

The biochemical agent may be a fungi including, but not necessarily limited to, *Candida antarctica, Candida tropicalis, Candida rugosa, Candida albicans, Candida cylindracea, Trichoderma reesei, Aspergillus niger, Aspergillus oryzae, Saccharomyces cerevisiae, Saccharomyces diastaticus*, and mixtures thereof.

Any or all of the above biologically produced by-products may be provided in an extended release form such as encapsulation by polymer or otherwise, pelletization with binder compounds, absorbed on a porous substrate, and/or a combination thereof. Specifically, the enzymes and other bio-products may be encapsulated to permit slow or timed release thereof. In non-limiting examples, the coating material may slowly dissolve or be removed by any conventional mechanism, or the coating could have very small holes or perforations therein for the bio-products within to diffuse through slowly. For instance, polymer encapsulation coatings such as used in fertilizer technology available from Scotts Company, specifically POLY-S® product coating technology, or polymer encapsulation coating technology from Fritz Industries could possibly be adapted to the methods of this invention. The bio-produced enzymes could also be absorbed onto zeolites, such as Zeolite A, Zeolite 13X, Zeolite DB-2 (available from PQ Corporation, Valley Forge, Pa.) or Zeolites Na-SKS5, Na-SKS6, NaSKS7, Na-SKS9, Na-SKS10, and Na-SKS13, (available from Hoechst Aktiengesellschaft, now an affiliate of Aventis S.A.), and other porous solid substrates such as MICROSPONGE™ (available from Advanced Polymer Systems, Redwood, Calif.) and cationic exchange materials such as bentonite clay. Further, the bio-products may be both absorbed into and onto porous substrates and then encapsulated or coated, as described above.

It is difficult, if not impossible, to specify with accuracy the amount of the biochemical agent and/or biologically produced by-product that should be added to a particular aqueous fluid gelled with viscoelastic surfactants to sufficiently or fully break the gel, in general. For instance, a number of factors affect this proportion, including but not necessarily limited to, the particular VES used to gel the fluid; the particular biochemical agent used; the temperature of the fluid; the downhole pressure of the fluid, the starting pH of the fluid; and the complex interaction of these various factors. Nevertheless, in order to give an approximate feel for the proportions of the bacteria to be used in the method of the invention, the amount of biochemical agent added may range from about 0.01 to about 20.0 volume %, based on the total weight of the fluid; preferably from about 0.1 to about 2.0 volume %.

In a typical fracturing operation, the fracturing fluid of the invention is pumped at a rate sufficient to initiate and propagate a fracture in the formation and to place propping agents into the fracture. A typical fracturing treatment would be conducted by mixing a 20.0 to 60.0 gallon/1000 gal water (volume/volume— the same values may be used with any Sl volume unit, e.g. 60.0 liters/–1000 liters) amine oxide VES, such as SurFRAQ, in a 2% (w/v) (166 lb/1000 gal, 19.9 kg/m$^3$) KCl solution at a pH ranging from about 6.0 to about 8.0. The biochemical agent or agents are added after the VES addition.

The various embodiments of the invention are summarized below.

1. The viscosity of the VES-gelled fluid may be reduced by the use of a biochemical agent (bacteria, fungus, enzyme, etc.) that will directly attack and break down the VES surfactant, such as by digestion, using the viscoelastic surfactant molecule as its carbon source. Suitable bacteria that can lower viscosity by this mechanism include, but are not necessarily limited to *Pseudomonas fluorescens, Pseudomonas stutzeri, Enterobacter cloacae, Corynebacterium glucoronlyticum, Enterococcus faecalis, Pseudomonas aerugnosa, Pseudomonas putida, Acinetobacter anitratus, Serrita marscens, Nitrobacter vulgaris, Clostridium thermocellum, Thermoanaerobacter ethanolicus, Clostridium pasteurianum, Rhodococcus* ST-5, and mixtures thereof.

2. The viscosity of the VES-gelled fluid may be reduced by a biochemical agent (bacteria, fungus, enzyme, etc.) that will directly attack and break down another component in the fluid besides the VES surfactant. This other component could be one that is normally added to the VES fluid in the normal course of operations, such as a glycol solvent for the VES surfactant itself, or it could be added solely for the purpose of providing a food source, i.e. carbon source or energy source for the biochemical agent, such as sugars and proteins. Such compounds include, but are not necessarily limited to, alcohols, monoalkyl alcohol polymers, alcohol fatty acids, alkyl fatty acids, glycols, starches, potassium formate or other formate, polysaccharides, sugars, sugar chelants, sugar alcohols, aliphatic alcohols, reservoir crude oils, proteins, VES stabilizers, amino acids, acetates, isocyanates, esters, lactates, butyrates, turpenes, propionates, salicylates, phosphonates, phospholipids, hexaonates, nitrilotriacetic acid, ethylenediaminetetraacetic acid, polyaspartates, amine chelant compounds (e.g. hydroxyethyliminodiacetic acid), pyrrolidone compounds, and mixtures thereof. In one non-limiting example, the biochemical agent could operate on the propylene glycol in SurFRAQ to produce one or more bio-alcohols or bio-surfactants that will directly degrade the VES gel. The alcohol or bio-surfactant causes the micelles to change from rod-shaped to sphere-shaped, or disperses or disaggregates the micellar structure of the VES-gelled surfactant.

3. The viscosity of the VES-gelled fluid may be reduced by a biochemical agent (bacteria, fungus, enzyme, etc.) that will disaggregate, disorganize, rearrange or otherwise disrupt the VES micellar structure to the extent that the viscosity is reduced.

4. The viscosity of the VES-gelled fluid may have its viscosity reduced by use of a biochemical agent, in this case a bacteria or fungus, which secrets an enzyme that in turn reduces the viscosity of the VES-gelled fluid by one of the discussed mechanisms, namely (a) directly attacking and digesting or otherwise breaking down the VES itself, or producing a by-product that does so, (b) attacking or breaking down a component of the fluid other than the VES, such as an alcohol, glycol, turpene or the like which is already present in the fluid, or is added for the specific purpose of reaction with the generated enzyme, or the enzyme produces a by-product that does so, and/or (c) disaggregating the VES micelles, or producing a by-product that does so.

5. The rate of microbe metabolic activity of the bacteria, fungi, and/or enzymes can be enhanced by an increase in fluid temperature, such as up to 180° F. (82° C.); by controlling fluid pH, such as to about 7.5 pH; and by increasing fluid pressure, such as pressures greater than about 600 psi (4.1 kPa). In one non-limiting embodiment of the invention, the pH adjustment is to a range between about 2.0 and about 11.0, preferably between about 3.0 and about 9.0 pH.

It will be appreciated that one biochemical agent, such as a particular bacteria type, may function to reduce viscosity by more than one mechanism in a particular VES system. For instance, a particular bacteria type may directly digest the VES itself, while also digesting propylene glycol that may be present to produce lipase that also acts on the VES, such as by catalysis, to also break down the surfactant molecules. Alternatively more than one bacteria type could be used, where the different bacteria operate by the same or different mechanisms as outlined above. Further, a bacteria and an enzyme could be used together. Other mechanism combinations are expected to be useful as well.

In one embodiment of the invention, the method of the invention is practiced in the absence of gel-forming polymers and/or gels or aqueous fluid having their viscosities enhanced by polymers.

Suitable bio-surfactants include, but are not necessarily limited to the group of glycolipid, phospholipids, lipopeptide, peptidolipids, neutral lipids, polysaccharide-fatty acid complexes, polysaccharide-protein complexes, and mixtures thereof. Suitable bio-solvents include, but are not necessarily limited to the group of methanol, ethanol, butanol, acetone, and mixtures thereof. Suitable bio-acids include, but are not necessarily limited to the group of formic, acetic, lactic, pyruvic, nitric acids, and mixtures thereof.

The present invention will be explained in further detail in the following non-limiting Examples that are only designed to additionally illustrate the invention but not narrow the scope thereof. These particular Examples further illustrate the embodiment of the invention where bacteria are the biochemical agent used to reduce the viscosity of a VES-gelled fluid by directly digesting the VES surfactant.

GENERAL PROCEDURE FOR EXAMPLES 1–3

Figure 1:
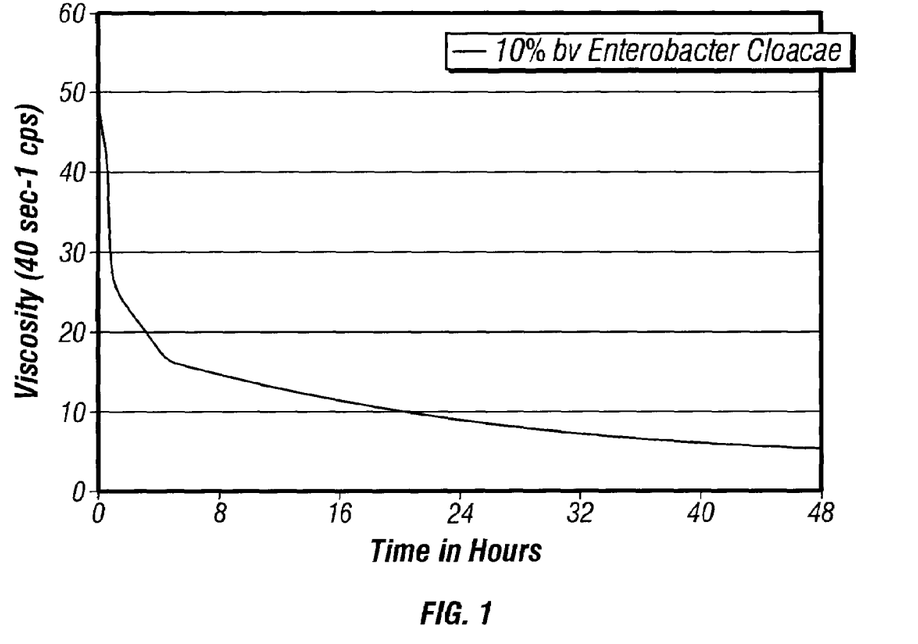
FIG. 1 is a graph of viscosity reduction over time employing 10% by volume (bv) *Enterobacter cloacae* in a 3% KCl fluid gelled with 2% TAPAO at 125° F. (52° C.) and ambient pressure.

To a Waring blender were added 500 mls of distilled water, 10 grams of KCl, followed by 5.0 to 10.0 mls of viscoelastic surfactant (such as SurFRAQ TAPAO available from Baker Hughes, used in the Examples). The blender was used to mix the components on a very slow speed, to prevent foaming, for about 15 minutes to viscosify the VES fluid. Mixed samples were then placed into 500 ml wide mouth Nalgene plastic bottles. VES-breaking bacteria were then added to each sample, and the sample was shaken vigorously for 60 seconds. The samples were placed in a water bath at the indicated temperature and visually observed every 30 minutes for viscosity reduction difference between the samples. The sample with fast-acting bacteria such as Enterobacter cloacae from Micro-TES Inc. lost viscosity noticeably quickly (Example 1; FIG. 1). Most gel breaking occurred over the first 24 hour period with additional breaking continuing during a 48 to 96 hour period.

Viscosity reduction can be visually detected. Shaking the samples and comparing the elasticity of gel and rate of air bubbles rising out of the fluid can be used to estimate the amount of viscosity reduction observed. Measurements using a Fann 35 rheometer at 100 rpm can also be used to acquire quantitative viscosity reduction of each sample. The preferred method of measurement is by using of a Fann 50 rheometer, where increases in temperature and pressure can be applied, simulating down hole temperature. The pressure limitation of a Fann 50 rheometer is 1000 psi (6.9 kPa).

EXAMPLES 1–3

Figure 2:
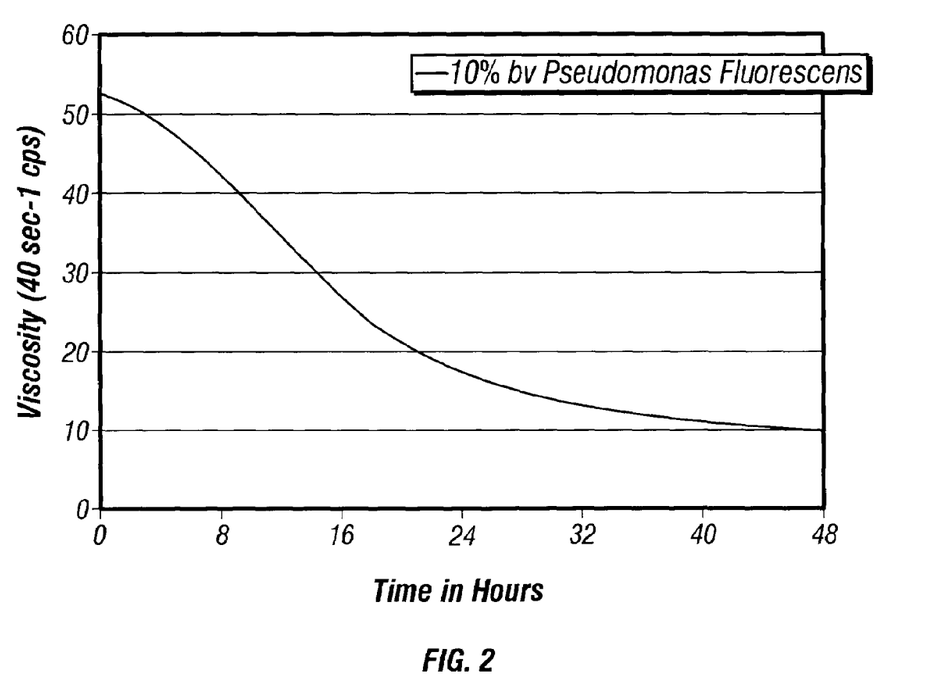
FIG. 2 is a graph of viscosity reduction over time employing 10% by volume *Pseudomonas fluorescens* in a 3% KCl fluid gelled with 2% TAPAO at 75° F. (24° C.) and ambient pressure.
Figure 3:
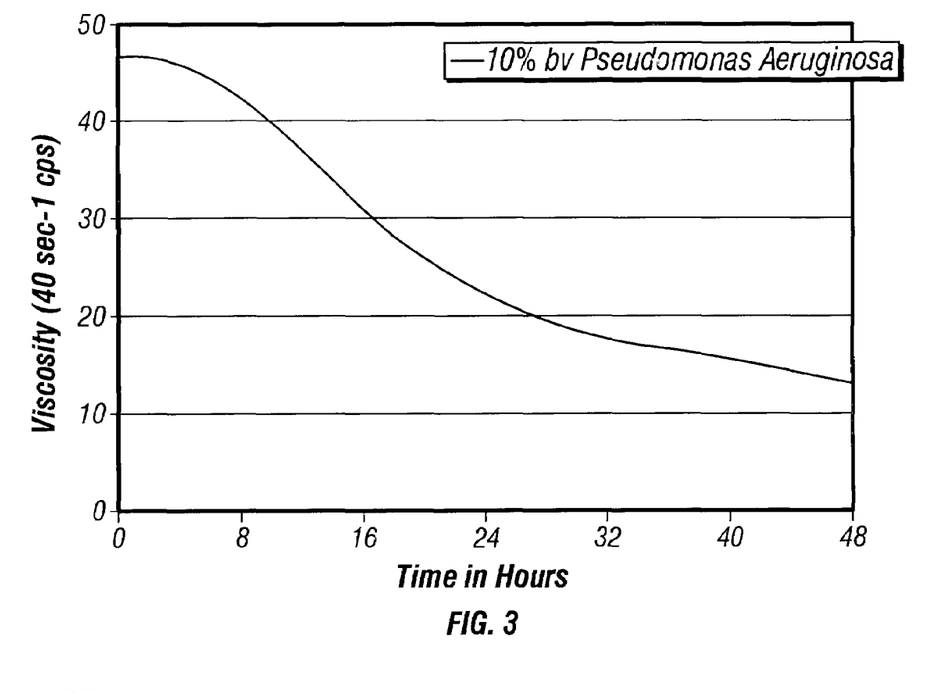
FIG. 3 is a graph of viscosity reduction over time employing 10% by volume *Pseudomonas aeruginosa* in a 3% KCl fluid gelled with 2% TAPAO at 75° F. (24° C.) and ambient pressure.

FIGS. 1–3 show the results of Examples 1–3, respectively, charting the effects of using the indicated bacteria at 10% by volume concentrations. It may be seen that the SurFRAQ viscosity broke most quickly with Enterobacter cloacae, losing most of its viscosity in the first 2–3 hours (Ex. 1, FIG. 1). Viscosity reduction was also more complete in this Example 1. Pseudomonas fluorescens (Ex. 2, FIG. 2) and Pseudomonas aeruginosa (Ex. 3, FIG. 3) gave viscosity reduction as well, but more gradually than Enterobacter cloacae. All Example were run using 2% TAPAO in 3% KCl. Example 1 (FIG. 1) was conducted at 125° F. (52° C.); Examples 2 and 3 (FIGS. 2 and 3, respectively) were conducted at 75° F. (24° C.).

EXAMPLES 4 AND 9

Figure 4:
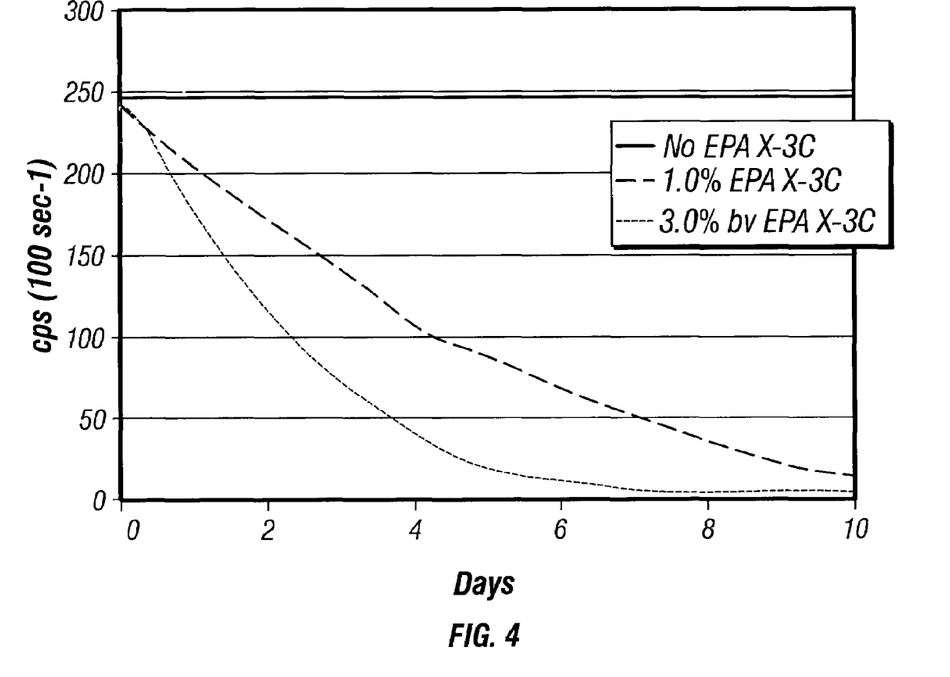
FIG. 4 is a graph of viscosity reduction over time employing 1.0% and 3.0% by volume (bv) *Pseudomonas aeruginosa esmeralda* X-3C (EPA X-3C) in a 3% KCl fluid gelled with 6.0% by TAPAO at 180° F. (82° C.) and 950 psi (6.5 kPa)
Figure 5:
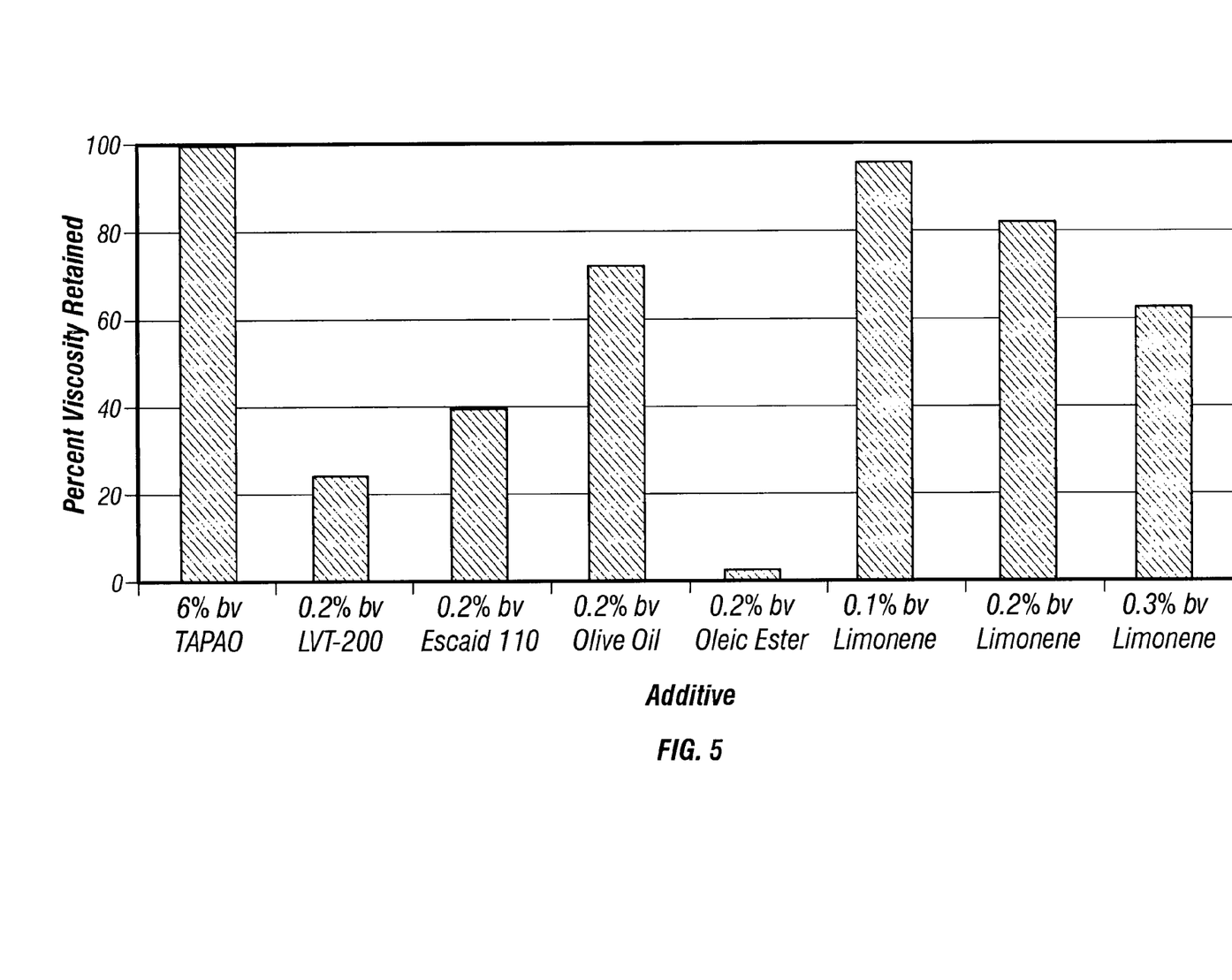
FIGS. 5, 6, 7, and 8 chart the effects of various bacteria nutrients on the viscosity reduction of 6.0% TAPAO at 180° F. (82° C.) and 400 psi (2.8 kPa)
Figure 6:
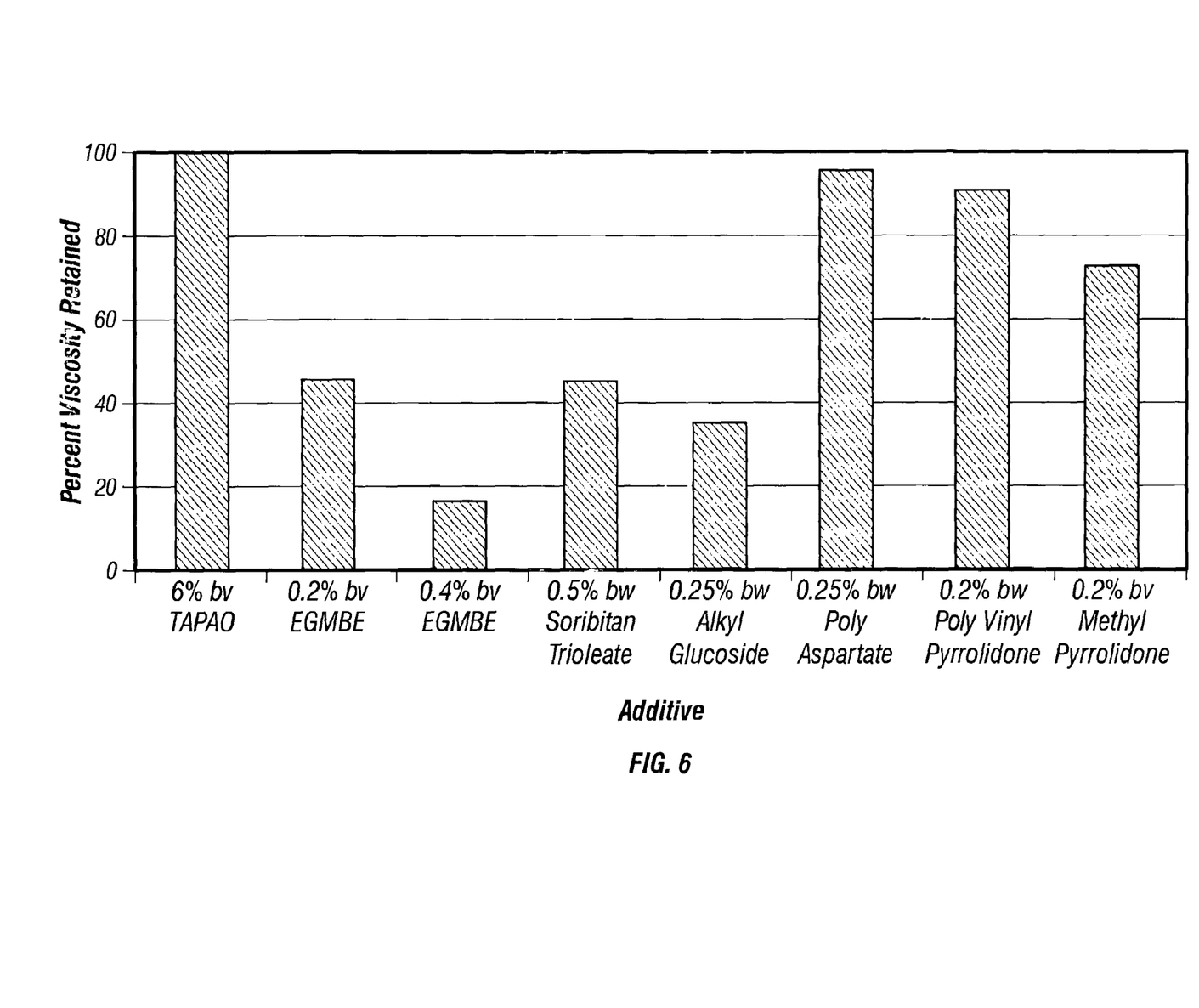
Figure 7:
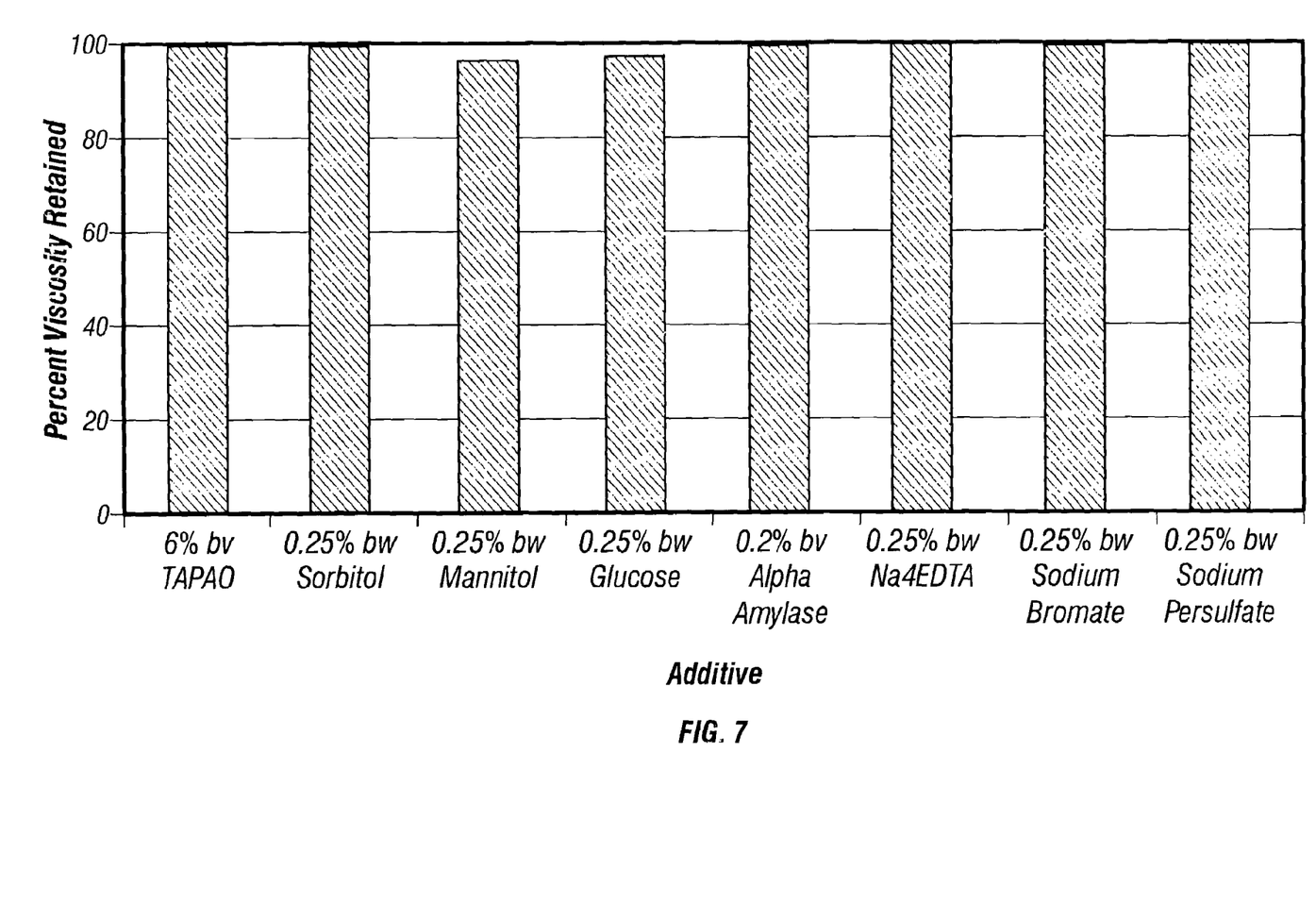
Figure 8:
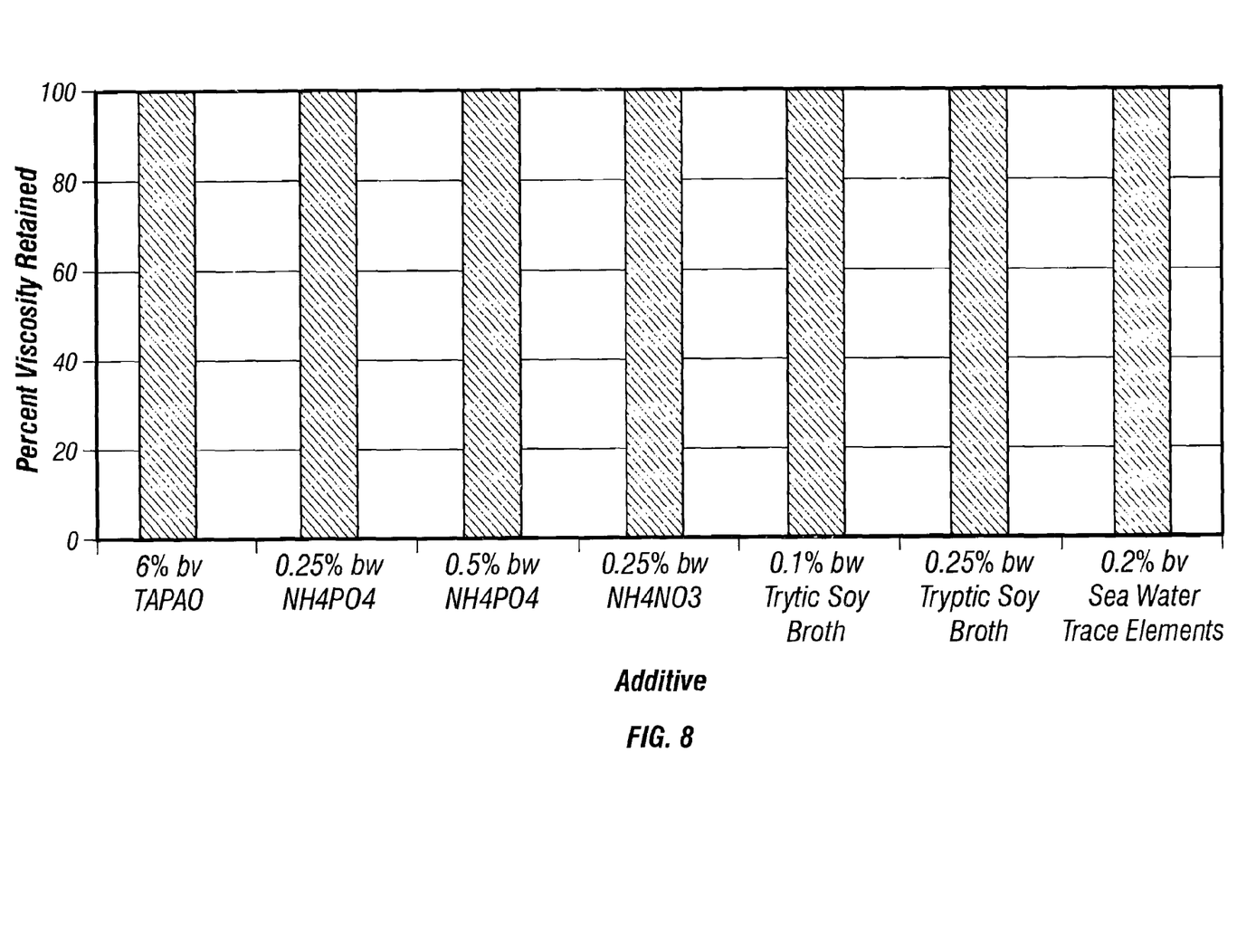
Figure 9:
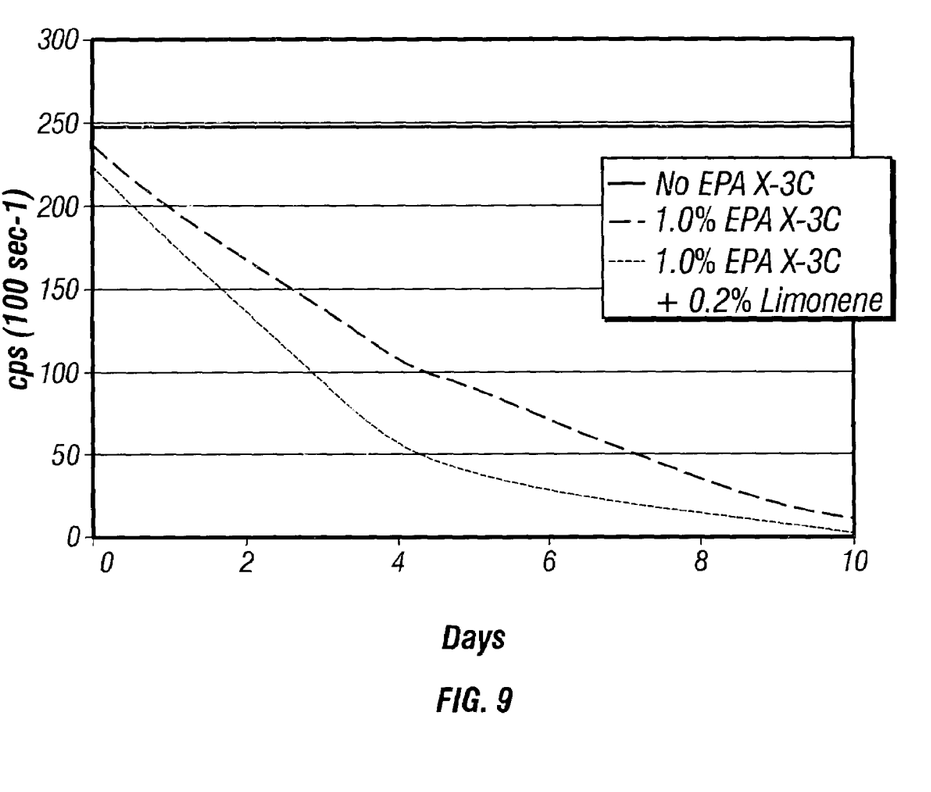
FIG. 9 is a graph of viscosity reduction over time employing 1.0% bv *Pseudomonas aeruginosa esmeralda* X-3C (EPA X-3C) with and without 0.2% bv Limonene in a 3% KCl fluid gelled with 6.0% bv TAPAO at 180° F. (82° C.) and 950 psi (6.5 kPa).

FIGS. 4 and 9 show the results of Examples 4 and 9, respectively. Both Examples use 6.0% bv TAPAO surfactant at 180° F. (82° C.) and 950 psi (6.5 kPa) on a Fann 50 rheometer. Both compositions contained 3% KCl. The order of mixing was: Dl water, KCl, NH$_4$NO$_3$, TSB, Limonene (if used), EPA X-3C, TAPAO. The nutrient package for both Examples was 30.0 pptg (3.4 kg/m$^3$) NH$_4$PO$_3$, 30 pptg (3.4 kg/m$^3$) NH$_4$NO$_3$, and 15.0 pptg (1.7 kg/m$^3$), Tryptic Soy Broth (TSB).

FIG. 4 shows a highly modified strain of Pseudomonas aeruginosa esmeralda X-3C from Micro-TES, Inc., can completely degrade the TAPAO viscosity within 10 to 12 days at 1.0% to 3.0% by addition. FIG. 9 shows the EPA X-3C strain at 1.0% concentration in the 6% by TAPAO with and without 0.2% Limonene. The data show enhanced microbe metabolic activity in the Limonene addition test.

EXAMPLES 5–8

FIGS. 5–8 show the results of Examples 5–8, respectively, charting the effects of various bacteria or microbe nutrients on 6% by TAPAO surfactant at 180° F. (82° C.) and 950 psi (6.5 kPa). It may be seen that proper selection of microbe nutrient is possible that has minimal effects on the TAPAO viscosity.

All of Examples 5–8 used a Fann 50 rheometer at 180° F. (82° C.) at 400 psi (2.8 kPa). Examples 5–7 used 6% TAPAO, 3% KCl, 30 pptg (3.4 kg/m$^3$) NH$_4$PO$_3$ and NH$_4$NO$_3$ combined, and 20.0 pptg (2.4 kg/m$^3$) TSB. Example 8 used 6% TAPAO and 3% KCl with the indicated additives. EGMBE in Example 6 refers to ethylene glycol monobutyl ether.

In the foregoing specification, the invention has been described with reference to specific embodiments thereof, and has been demonstrated as effective in providing methods and compositions for a VES fracturing fluid breaker mechanism. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of viscoelastic surfactants, biochemical agents, and other components falling within the claimed parameters, but not specifically identified or tried in a particular composition or fluid, are anticipated to be within the scope of this invention.

I claim:

1. A method for breaking viscosity of aqueous fluids gelled with a viscoelastic surfactant (VES) comprising:
    adding to an aqueous fluid gelled with at least one viscoelastic surfactant a viscosity-breaking bacteria in an amount effective to reduce the viscosity of the gelled aqueous fluid, and the bacteria reducing the viscosity of the gelled aqueous fluid by disaggregating or rearranging a micelle structure of the VES.

2. The method of claim 1 where the bacteria digests the VES directly.

3. The method of claim 1 where the bacteria digests a component of the fluid other than the VES to produce a by-product that in turn reduces the viscosity of the gelled aqueous fluid.

4. The method of claim 3 where the component is selected from the group consisting of alcohols, monoalcohol polymers, alcohol fatty acids, alkyl fatty acids, glycols, starches, potassium or other formate, polysaccharides, sugars, sugar chelants, sugar alcohols, aliphatic alcohols, reservoir crude oils, proteins, VES stabilizers, amino acids, acetates, phosphonates, phospholipids, lactates, isocyanates, esters, turpenes, butyrates, propionates, salicylates, hexaonates, nitrilotriacetic acid, ethylenediaminetetraacetic acid, amino chelant compounds, polyaspartates, pyrrolidone compounds, and mixtures thereof.

5. The method of claim 3 where the by-product is an enzyme selected from the group of enzymes that (a) catalyze a reaction to break down the VES directly, and (b) catalyze a reaction utilizing another component of the fluid other than VES to produce a by-product that in turn degrades the VES surfactant.

6. The method of claim 5 where the enzyme is selected from the group consisting of lipase, oxidase, hydrolase, transferase, and mixtures thereof.

7. The method of claim 3 where the by-product is selected from the group consisting of a bio-surfactant, a bio-solvent, a bio-acid, and combinations thereof.

8. The method of claim 7 where the bio-surfactant is selected from the group consisting of a glycolipid, phospholipids, lipopeptide, peptidolipids, neutral lipids, polysaccharide-fatty acid complexes, polysaccharide-protein complexes, and mixtures thereof.

9. The method of claim 7 where the bio-solvent is selected from the group consisting of methanol, ethanol, butanol, acetone, and mixtures thereof.

10. The method of claim 7 where the bio-acid is selected from the group consisting of formic acid, acetic acid, lactic acid, pyruvic acid, nitric acid, and mixtures thereof.

11. The method of claim 1 where the VES is selected from the group consisting of amines, amine salts, quaternary ammonium salts, amidoamine oxides, amine oxides, and mixtures thereof.

12. The method of claim 1 where the VES is tallow amido propylamine oxide (TAPAO).

13. The method of claim 1 where the VES is erucyl bis-(2-hydroxyethyl) methyl ammonium chloride.

14. The method of claim 1 where the bacteria selected from the group consisting of the classes *Enterobacter, Enterococcus, Pseudomonas, Bacillus, Leptospirillum, Clostridium, Arthrobacter, Rhodobacter, Rhodococcus, Micrococcus, Serrita, Thermoanaerobacter, Thiobacillus, Pyrococcus, Lactobacillus, Achromobacter, Propionibacterium, Thermomicrobium, Nitrobacter, Nitrosomonas, Sulfolobus, Methanobacterium, Methanococcus, Bacteroides, Fusobacterium, Syntrophus, Acetogenium, Actinomyces, Acetobacter, Citrobacter, Alteromonas, Acinetobacter, Flavobacterium, Corynebacterium*, and mixtures thereof.

15. The method of claim 1 where the bacteria is selected from the group consisting of *Arthrobacter globiformis, Enterobacter cloacae, Lactobacillus sporogenes, Lactobacillus bulgaricus, Lactobacillus acidophilus, Pseudomonas fluorescens, Pseudomonas aeruginosa, Actinomyces israeli, Pseudomonas putida, Nitrobacter vulgaris, Arthrobactor* M153B, *Bacillus megaterium, Thiobacillus novellus, Bacillus subtilis, Bacillus licheniformis, Clostridium pasteurianum, Corynebacterium glucoronlyticum, Enterococcus faecalis, Pyrococcus abyssi, Rhodococcus* ST-5, *Rhodococcus* 33, *Rhodococcus* H13-A, *Thermoanaerobacter ethanolicus, Thermoanaerobacter mathranii, Nitrosomonas europaea, Propionibacterium propionicus, Rhodobacter sphaeroides, Clostridium thermocellum, Clostridium* ATCC #53797, *Clostridium* ATCC #53793, *Corynebacterium hydrocarbolastus, Acetomicrobium flavidum, Acetobacter pasteurianus, Serrita marscens, Acetobacter aceti, Achromobacter xylosoxidans*, and mixtures thereof.

16. The method of claim 1 where the bacteria, has been bio-technically engineered by a technique selected from the group consisting of growth challenge, culture for selective gene expression, genetic modification through gene splicing techniques, and combinations thereof.

17. The method of claim 1 where the amount of bacteria added ranges from about 0.01 to about 20.0 percent by volume based on the total volume of fluid.

18. The method of claim 1 where the microbe metabolic activity of the bacteria is enhanced by a parameter selected from the group consisting of temperature, pressure, pH adjustment of the fluid to between about 2.0 and 11.0, and combinations thereof.

19. The method of claim 1 further comprising
    adding a glycol to the aqueous fluid; and
    adding a glycol splitting bacteria, where the bacteria is selected from the group consisting of *Pseudomonas fluorescens, Pseudomonas stutzeri, Pseudomonas aeruginosa, Pseudomonas putida, Acinetobacter anitratus, Bacillus subtilis, Bacillus licheniformis, Clostridium pasteurianum, Rhodococcus* ST-5, and mixtures thereof.

20. A method for breaking viscosity of aqueous fluids gelled with a viscoelastic surfactant (VES) comprising:
    adding to an aqueous fluid gelled with at least one viscoelastic surfactant bacteria in an amount effective to reduce the viscosity of the gelled aqueous fluid; and
    the bacteria disaggregating or rearranging a micelle structure of the VES,
    where the VES is selected from the group consisting of amines, amine salts, quaternary ammonium salts, amidoamine oxide, and amine oxides, and
    where the bacteria is selected from the group of bacteria that directly digests the viscoelastic surfactant and bacteria that digests a component in the fluid other than the VES to produce an enzyme which in turn reduces the viscosity of the gelled aqueous fluid.

21. The method of claim 20 where the VES is tallow amido propylamine oxide (TAPAO).

22. The method of claim 20 where the bacteria is selected from the group consisting of *Arthrobacter globiformis, Enterobacter cloacae, Lactobacillus sporogenes, Lactobacillus bulgaricus, Lactobacillus acidophilus, Pseudomonas fluorescens, Pseudomonas aeruginosa, Actinomyces israeli, Pseudomonas putida, Nitrobacter vulgaris, Arthrobactor* M153B, *Bacillus megaterium, Thiobacillus novellus, Bacillus subtilis, Bacillus licheniformis, Clostridium pasteur-* ianum, *Corynebacterium glucoronlyticum, Enterococcus faecalis, Pyrococcus abyssi, Rhodococcus* ST-5, *Rhodococcus* 33, *Rhodococcus* H13-A, *Thermoanaerobacter ethanolicus, Thermoanaerobacter mathranii, Nitrosomonas europaea, Propionibacterium propionicus, Rhodobacter sphaeroides, Clostridium thermocellum, Clostridium* ATCC #53797, *Clostridium* ATCC #53793, *Corynebacterium hydrocarbolastus, Acetomicrobium flavidum, Acetobacter pasteurianus, Serrita marscens, Acetobacter aceti, Achromobacter xylosoxidans,* and mixtures thereof.

23. The method of claim 22 where the bacteria has been bio-technically engineered by a technique selected from the group consisting of growth challenge, culture for selective gene expression, genetic modification through gene splicing techniques, and combinations thereof.

24. The method of claim 20 where the bacteria digests a component of the fluid other than the VES to produce a by-product that in turn reduces the viscosity of the gelled aqueous fluid, where the by-product is selected from the group consisting of a bio-surfactant, a bio-solvent, a bio-acid, and combinations thereof, that in turn reduces the viscosity of the gelled aqueous acid.

25. The method of claim 20 where the amount of bacteria added ranges from about 0.01 to about 20.0 percent by volume based on the total volume of fluid.

26. The method of claim 20 where the microbe metabolic activity of the bacteria is enhanced by a parameter selected from the group consisting of temperature, pressure, pH adjustment of the fluid to between about 2.0 and 11.0, and combinations thereof.

* * * * *